United States Patent
Lin (10) Patent No.: US 12,120,734 B2
(45) Date of Patent: Oct. 15, 2024

(54) METHOD FOR ACCESSING A COMMUNICATION NETWORK, ASSOCIATION METHOD, TERMINAL, BASE STATION, AND CORRESPONDING COMPUTER PROGRAMS

(71) Applicant: ORANGE, Issy-les-Moulineaux (FR)

(72) Inventor: Hao Lin, Châtillon (FR)

(73) Assignee: ORANGE, Issy-les-Moulineaux (FR)

( * ) Notice: Subject to any disclaimer, the term of this patent is extended or adjusted under 35 U.S.C. 154(b) by 330 days.

(21) Appl. No.: 17/622,945

(22) PCT Filed: Jun. 9, 2020

(86) PCT No.: PCT/EP2020/065894
§ 371 (c)(1),
(2) Date: Dec. 27, 2021

(87) PCT Pub. No.: WO2020/260002
PCT Pub. Date: Dec. 30, 2020

(65) Prior Publication Data
US 2022/0240308 A1   Jul. 28, 2022

(30) Foreign Application Priority Data
Jun. 28, 2019   (FR) ........................ 1907077

(51) Int. Cl.
*H04W 74/08*   (2024.01)
*H04W 48/10*   (2009.01)
(Continued)

(52) U.S. Cl.
CPC ........... *H04W 74/08* (2013.01); *H04W 48/10* (2013.01); *H04W 72/044* (2013.01)

(58) Field of Classification Search
None
See application file for complete search history.

(56) References Cited

U.S. PATENT DOCUMENTS 11,102,825 B2   8/2021   Chen et al.
2017/0231011 A1*  8/2017  Park .................. H04W 72/0446
(Continued)

FOREIGN PATENT DOCUMENTS

| CN | 108076532 A | 5/2018 |
| WO | 2008097030 A1 | 8/2008 |
| WO | 2018127240 A1 | 7/2018 |

OTHER PUBLICATIONS

English translation of the Written Opinion of the International Searching Authority dated Jul. 24, 2020 for corresponding International Application No. PCT/EP2020/065894, filed Jun. 9, 2020.
(Continued)

*Primary Examiner* — Hong Shao
(74) *Attorney, Agent, or Firm* — David D. Brush; Westman, Champlin & Koehler, P.A.

(57) ABSTRACT

A method for access to a communication network, implemented by a terminal. The method includes: receiving system information broadcast by the network, the system information including an identification of at least one time-frequency resource capable of carrying a piece of information relative to a unique terminal identifier; transmitting to the network an access request, the access request carrying a first piece of information representative of a unique identifier of the terminal, transmitted on one of the time-frequency resources identified on the basis of the system information, called specific resource; and authorizing access to the network in the case of reception of a response to the access request carrying a second piece of information representative of the unique identifier of the terminal.

15 Claims, 3 Drawing Sheets

(51) Int. Cl.
  *H04W 72/04*     (2023.01)
  *H04W 72/044*    (2023.01)

(56) References Cited

U.S. PATENT DOCUMENTS

2018/0103465  A1      4/2018   Agiwal et al.
2019/0132882  A1*     5/2019   Li .................... H04W 74/0833
2019/0335515  A1     10/2019   Chen et al.

OTHER PUBLICATIONS

International Search Report dated Jul. 15, 2020 for corresponding International Application No. PCT/EP2020/065894, Jun. 9, 2020.
Written Opinion of the International Searching Authority dated Jul. 15, 2020 for corresponding International Application No. PCT/EP2020/065894, filed Jun. 9, 2020.

* cited by examiner

METHOD FOR ACCESSING A COMMUNICATION NETWORK, ASSOCIATION METHOD, TERMINAL, BASE STATION, AND CORRESPONDING COMPUTER PROGRAMS

CROSS-REFERENCE TO RELATED APPLICATIONS

This Application is a Section 371 National Stage Application of International Application No. PCT/EP2020/065894, filed Jun. 9, 2020, which is incorporated by reference in its entirety and published as WO 2020/260002 A1 on Dec. 30, 2020, not in English.

1. FIELD OF THE INVENTION

The field of the invention is that of digital communications.

More precisely, the invention relates to the phase of attachment of a terminal to a communication network. It proposes in particular a solution for rapid access to the network, for example for applications of the instant messaging type.

The invention has in particular, but not exclusively, uses in the field of LTE (Long Term Evolution) or of 5G.

2. PRIOR ART

Conventionally, in order for a terminal to be able to communicate with another in a communication network, two phases are implemented: a phase of attachment to the communication network, during which a terminal is identified, synchronized with the network and configured, and a communication phase, during which the terminal can exchange useful data with the network and/or with another terminal attached to the network.

For example, according to the LTE standard, a random access procedure based on the use of the RACH channel (Random Access Channel), called RACH procedure, is implemented in order to be able to attach a terminal to the network. Such a channel is "random access" since, from the point of view of the network, it is difficult to know at which moment a terminal will seek to connect to the network.

The main goals of the RACH procedure are to ensure the synchronization of the terminal and of the base station (for example the eNB according to the LTE standard) on the upstream link and to identify the terminal, in order for the network to be able to know it and configure it.

As for the synchronization of the base station and of the terminal on the downlink, it can be ensured by the periodic broadcasting of system information carrying synchronization information.

The main steps of the RACH procedure are described below.

Figure 1:
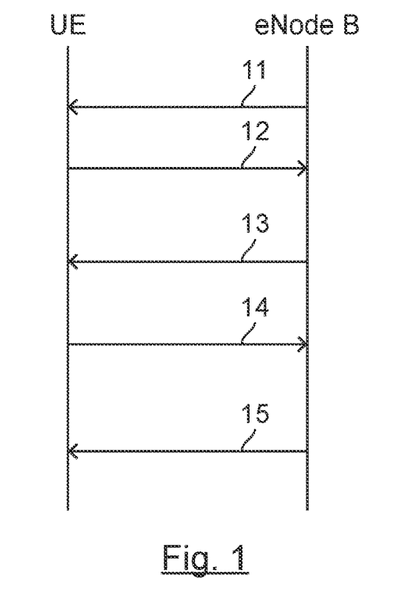
FIG. 1 illustrates the main steps of the RACH procedure according to the prior art.

As illustrated in FIG. 1, when the terminal UE exits standby mode or enters a coverage zone of a base station, eNodeB for example, it receives system information 11, regularly broadcast in the network by an entity of the network, for example the base station eNodeB. Such information identifies in particular at least one time-frequency resource, called RACH resource, intended to be used by the terminal for the RACH procedure.

Upon reception of this system information, the terminal UE randomly selects a preamble in a group of available preambles, and transmits, on the RACH resource, a first message 12 carrying this preamble, an identifier, noted as RA-RNTI (Random Access-Radio Network Temporary Identifier), associated with the RACH resource and thus known to the network, as well as a possible indication of the volume to be provided for the transmission of data. The identifier RA-RNTI can in particular be used to detect transmission errors (CRC or Cyclic Redundancy Check).

Since the network has not yet identified the terminal, the network (or more precisely an entity of the network, for example the base station) responds by a second message 13, noted as RAR (Random Access Response), carrying the identifier of the preamble received on the RACH resource, noted as PID (Preamble ID), an estimation of a temporal offset to be applied for the mission of a message by the terminal, taking into account the travel time between the terminal and the base station, noted as TA (Timing Advance), a temporary identifier for access to the network, note as TC-RNTI (Temporary Cell Radio Network Temporary Identifier), and an indication of the resources allocated for the communications on the uplink, noted as UL grant. These various parameters can be encapsulated in packets and transmitted on the MAC layer. In particular, such packets can be encoded by using the identifier RA-RNTI, associated with the RACH resource and thus known to the network. In this way, only the terminal having transmitted the first message 12 on the RACH resource can decode these packets.

Upon reception of these packets, the terminal can thus decode them, and verify whether the identifier PID indeed corresponds to the preamble that it selected and transmitted in the first message 12. If this is the case, it can continue to decode the various parameters. Otherwise, it interrupts the decoding.

When the terminal has verified that the identifier PID received indeed corresponds to the preamble transmitted, it knows that the network correctly received the first message 12 with the preamble. It can thus adjust its instant of emission while taking into account the parameter TA, and transmit its identifier UE_ID in a third message 14, on the resources allocated for the uplink communications UL grant. The identifier UE_ID is for example the IMSI number (International Mobile Subscriber Identifier) of the SIM card of the terminal. In particular, this third message 14 can be encoded by using a temporary identifier TC-RNTI generated by the base station.

Upon reception of this request, the base station can send a fourth message 15 to the terminal, so as to resolve the possible collision problems. This message carries the identifier of the terminal UE_ID.

If this identifier of the terminal UE_ID is identical to that transmitted in the third message, this means that the terminal is known to the network. The terminal can thus change the temporary identifier TC-RNTI into C-RNTI (Cell RNTI), which is a specific identifier used by the terminal during the phase of communication with the network, after the attachment phase, for example as CRC to detect transmission errors.

Otherwise, this means that the terminal is not known to the network. The terminal must thus start the RACH procedure over.

After the RACH procedure, the base station thus knows the identity UE_ID of the terminal. However, the latter cannot yet transmit useful data (i.e. start the communication phase) as long as the network has not configured the terminal by implementing for example a protocol for control of radio resources of the RRC type (radio resource control). This configuration is necessary in order for the terminal to efficiently use the radioelectric link provided by the base station.

The RACH and RRC procedures are thus particularly useful for access to the network and the configuration of the terminal.

However, a disadvantage of these techniques is that they must be implemented each time that the terminal desires to access the network, for example when the terminal exits a standby mode or switches to a new cell of a cellular network (handover). But such techniques are rather long to implement and costly in terms of resources.

In particular, when the communication phase is of a short duration, for example when the terminal emits messages of the instant messaging type (SMS, MMS, chat, emission of a message via an application of the type Facebook, WhatsApp, Twitter—trademarks—for example), the phase of attachment to the network can be more costly in terms of time and/or resources than the communication phase. Indeed, such instant messages generally have a small size, of approximately several bytes or kilobytes, and the cost of the attachment phase becomes non-negligible with respect to the cost of the communication phase.

There is therefore a need for a new technique for access to the network, which is simple to implement and not very costly in terms of time and/or resources.

3. DISCLOSURE OF THE INVENTION

The invention proposes, according to at least one embodiment, a method for access to a communication network, implemented by a terminal.

According to the invention, such a method comprises:
- the reception of system information broadcast by said network, the system information comprising an identification of at least one time-frequency resource capable of carrying a piece of information relative to a unique terminal identifier, the transmission to the network of an access request, said access request carrying a first piece of information representative of a unique identifier of said terminal, transmitted on at least one of said time-frequency resources identified on the basis of said system information, called specific resource,
- the authorization of access to said network in the case of reception of a response to said access request carrying a second piece of information representative of the unique identifier of said terminal.

The proposed solution thus allows to identify, in the system information broadcast in the network, one or more specific time-frequency resources that the terminal will be able to use starting with its first sending to the network to transmit its unique identifier, which can be its physical layer identifier, its IMSI identifier, or any other unique identifier, for example such as its MSISDN (Mobile Station ISDN Number) identifier.

Thus, the procedure for access to the network according to at least one embodiment of the invention is simplified with respect to the prior art, since it is based on the exchange of two main messages (an access request carrying a unique identifier of the terminal, and a response to the request), whereas it is based on the exchange of four main messages according to the prior art as described in relation to FIG. 1.

Because of the limited number of messages exchanged, the procedure for access to the network according to at least one embodiment of the invention is also faster than the RACH procedure described in relation to the prior art and allows to optimize the spectral efficiency during the access procedure.

It is noted that such an access procedure must be implemented each time that the terminal leaves the network (for example because it enters standby mode) and desires once again to "enter" the network (for example because it exits standby mode). It is thus desirable to simplify and accelerate the access procedure.

In particular access to the network is authorized if a response to the access request is received, and if this response carries a second piece of information representative of the unique identifier of the terminal. For example, the first and second pieces of information representative of the unique identifier of the terminal are identical, or correlated. These first and second pieces of information allow to identify the same terminal.

According to a first embodiment, the first piece of information representative of the unique identifier of the terminal can be transmitted in a dedicated resource, noted as TFR, identified on the basis of the system information.

According to a second embodiment, the first piece of information representative of the unique identifier of the terminal can be transmitted in a resource conventionally used for the channel access, for example the RACH resource. According to this second embodiment, the network can reserve a larger time-frequency resource for the transmission of the first piece of information representative of the unique identifier and of the conventional information for access to the channel.

According to a specific embodiment, said access request also carries a useful message intended to be transmitted to at least one other terminal. In particular, the useful message is transmitted with the first piece of information representative of a unique identifier of the terminal on the specific time-frequency resource, or on another time-frequency resource capable of carrying a useful message, identified in the system information.

The proposed solution thus allows the transmission of useful messages from the terminal to the network during the access procedure, i.e. without requiring the previous configuration of the terminal (based for example on the implementation of a protocol for control of radio resources of the RRC type).

In particular, the proposed solution allows to improve the spectral efficiency of the network, in particular when the terminal sends messages with an application of the instant messaging type (SMS, MMS, chat, Facebook, Twitter, WhatsApp—trademarks, etc.).

It is noted in this respect that the unique identifier of the terminal allows, inter alia, the identification of the emitter of a useful message via an application of the social network type. This is therefore an identifier at the application level.

According to a specific embodiment, the system information identifies at least two time-frequency resources capable of carrying the useful message. According to this embodiment, the method implements the selection of at least one of the time-frequency resources while taking into account the size of the useful message intended to be transmitted to at least one other terminal. In this case, the useful message can be transmitted on the selected resource.

For example, the system information identifies a first resource for the transmission of useful messages having a size of approximately several bits, noted as TFR1, a second resource for the transmission of messages of several bytes, noted as TFR2, and a third resource for the transmission of messages of several kilobytes, noted as TFR3.

The use of the time-frequency resources is thus optimized by adapting them to the size of the useful message.

According to a specific embodiment, the first piece of information representative of the unique identifier of said terminal and/or the useful message are transmitted to the network while taking into account a piece of information on modulation and coding associated with the specific time-frequency resource selected for the transmission. Such a piece of information on modulation and coding is obtained on the basis of the system information.

In this way, the terminal has knowledge of the modulation and coding schemes (MCS) to be used in the network, in particular for the transmission of useful data, starting from the beginning of the access procedure.

According to a specific embodiment, the unique identifier of the terminal is an integer, and the transmission also transmits a reference signal obtained by applying a cyclical offset to a predefined base sequence. Such a cyclical offset can be determined according to the unique identifier of the terminal.

The reference signal transmitted from the terminal to the network does not therefore carry a conventional base sequence, but a modified version of this sequence (cyclically offset) allowing to transmit the unique identifier of the terminal, or a part of this identifier, directly in the reference signal.

The transmission bitrate is thus optimized, by reducing the quantity of bits necessary to transmit the unique identifier of the terminal.

For example, the reference signal is of the demodulation reference signal type (DMRS). As for the base sequence, it can be defined for the network, normalized, or other. It is a sequence known to the terminal and to at least one other entity of the network, for example a base station.

In particular, when the unique identifier of the terminal is greater than a maximum number of cyclical offsets, the first piece of information representative of the unique identifier of the terminal comprises the whole part of the ratio between the unique identifier and the maximum number of cyclical offsets, also called remaining value. The maximum number of cyclical offsets can in particular be obtained on the basis of the system information.

In this way, the quantity of bits necessary to transmit the first piece of information representative of the unique identifier of the terminal is small.

For example, the maximum number of cyclical offsets is equal to the length of said base sequence.

Alternatively, the terminal can directly transmit its unique identifier to the network.

According to a specific embodiment, the access request also carries a preamble selected from a plurality of preambles, transmitted on the specific time-frequency resource or on a time-frequency resource capable of carrying the preamble (for example the RACH resource) identified on the basis of said system information. According to this embodiment, the authorization of access to the network is granted when the response to the access request carries the second piece of information representative of the unique identifier of the terminal and a piece of information representative of the selected preamble.

A time-frequency resource dedicated to the transmission of the preamble is also called RACH occasion. For example, such a RACH occasion is associated with one or more time-frequency resources capable of carrying a useful message.

According to a specific embodiment, the access request also carries at least one indicator indicating a return to standby mode of the terminal after the authorization of access to the network.

For example, a part of the specific time-frequency resource is reserved for the transmission of such an indicator. Alternatively, a part of a time-frequency resource dedicated to the transmission of a preamble is reserved for the transmission of such an indicator. Alternatively, at least two types of preambles are defined, a first type of preamble to be used when the terminal desires to go into standby mode after having accessed the channel, a second type of preamble to be used when the terminal desires to continue the configuration procedure after having accessed the channel. According to this alternative, the indicator is therefore the type of the selected preamble.

Such an indicator can in particular be used by an entity of the network to detect the transmission of a message of the instant messaging type, for which the terminal desires to go back into standby mode after the emission of the useful message.

In particular, when the terminal has received a response to the access request and access to the network is authorized, the terminal can go into standby mode. In this way, the energy consumption of the terminal emitting the access request is limited.

Alternatively, when access to the network is authorized, the terminal can remain in active mode.

For example, if the access request does not carry a useful message, said method implements a phase of configuration of said terminal with said network.

Indeed, if the access request carries the first piece of information relative to the unique identifier of the terminal, but does not carry a useful message, this means that the terminal uses the proposed solution to rapidly access the network. In this case, the terminal does not desire to return to standby mode when access to the network has been authorized for it.

According to a specific embodiment, in the case of reception of a response to said access request not carrying a second piece of information representative of the unique identifier of said terminal, said method comprises the retransmission of said access request, said first piece of information representative of the unique identifier of said terminal being transmitted on a new specific time-frequency resource identified in said response.

This specific embodiment can in particular be implemented when an entity of the network, for example the base station, can decode the preamble of the access request transmitted on a dedicated time-frequency resource, but cannot decode the useful message and/or the first piece of information representative of the unique identifier of the terminal of the access request transmitted on a specific time-frequency resource.

According to this embodiment, rather than entirely restarting the access procedure, it is possible to allocate to the terminal a new specific resource for the transmission of the first piece of information representative of the unique identifier of the terminal, and optionally of the useful message.

Moreover, since the base station indicates to the terminal the new resource to be used for the transmission of the first piece of information representative of the unique identifier of the terminal, and optionally of the useful message, the risk of collision with access requests emitted by other terminals is limited.

According to a specific feature, in the case of non-reception of a response to the access request after a predetermined time interval, said method comprises the retransmission of said access request.

In other words, after the transmission of the access request, the terminal continues listening for a predetermined duration, noted as RAR window. If it has not received a response to its access request after this duration, it can retransmit the access request, optionally by using other time-frequency resources.

In another embodiment, the invention relates to a corresponding terminal.

Such a terminal is in particular adapted to implement the access method described above. It is for example a piece of user equipment such as a mobile telephone. This terminal can of course include the various features relative to the method according to the invention, which can be combined or taken alone. Thus, the features and advantages of this terminal are the same as those of the method described above. Consequently, they are not described in more detail.

The invention also relates, according to one embodiment, to a method for attachment of a terminal to a communication network. In particular, such a method is implemented in an entity of the network, for example a base station.

According to the invention, such a method comprises:
the broadcasting of system information by said network, the system information comprising an identification of at least one time-frequency resource capable of carrying a piece of information relative to a unique terminal identifier, the verification of the reception, on at least one of said time-frequency resources identified on the basis of the system information, called specific resource, of a first piece of information representative of a unique identifier of the terminal carried by a request for access to said network;
if said first piece of information representative of a unique identifier of said terminal is received, the transmission to said terminal of a response to said access request, carrying a second piece of information representative of the unique identifier of said terminal.

Such a method is in particular adapted to receiving an access request emitted by a terminal, according to the method for access to the network described above.

As already indicated, according to at least one embodiment, it allows a terminal to rapidly access the network.

According to a specific embodiment, said verification also verifies the reception, on the specific time-frequency resource used for the transmission of the first piece of information representative of the unique identifier of the terminal or on another time-frequency resource capable of carrying a useful message, identified on the basis of said system information, of a useful message intended to be transmitted to at least one other terminal.

The method also comprises the transmission of said useful message to said at least one other terminal if said first piece of information representative of a unique identifier of said terminal and said useful message are received.

The method according to this embodiment thus allows to optimize the spectral efficiency of the network.

According to a specific embodiment, since the unique identifier of the terminal is an integer and a reference signal obtained by applying a cyclical offset to a predefined base sequence is received on the specific time-frequency resource, said method implements a step of determining the unique identifier of said terminal.

To do this, knowing the base sequence and having received the reference signal, it is indeed possible to determine the number of offsets applied to the base sequence, and thus the unique identifier of the terminal.

According to a specific embodiment, the method also comprises:
the verification of the reception, on said time-frequency resource or on at least one time-frequency resource capable of carrying a preamble, identified on the basis of the system information, of a preamble carried by the access request,
if said preamble is received and said first piece of information representative of a unique identifier of said terminal is not received, the transmission to said terminal of a response to said access request carrying a piece of information representative of said preamble and identifying a new specific time-frequency resource (i.e. for the transmission of said first piece of information and optionally of the useful message).

In another embodiment, the invention relates to a corresponding base station.

Such a base station is in particular adapted to implement the attachment method described above. It is for example an eNodeB according to the LTE standard, or gNB according to 5G. The base station can of course include the various features relative to the method according to the invention, which can be combined or taken alone. Thus, the features and advantages of the base station are the same as those of the method described above. Consequently, they are not described in more detail.

The invention also relates to one or more computer programs including instructions for the implementation of at least one method as described above when this or these programs are executed by at least one processor.

The invention also relates to an information medium readable by a computer and including instructions of a computer program as mentioned above.

4. LIST OF THE DRAWINGS

Other features and advantages of the invention will appear more clearly upon reading the following description of a specific embodiment, given as a simple illustrative and non-limiting example, and the appended drawings, among which.

5. DESCRIPTION OF AN EMBODIMENT OF THE INVENTION

5.1 General Principle

The general principle of the invention is based on a novel technique allowing a terminal to attach itself simply and rapidly to a network. To do this, the system information conventionally broadcast by the network is modified to identify at least one time-frequency resource capable of transmitting a piece of information relative to a unique terminal identifier to the network. Such resources are not therefore reserved for a specific terminal, but can be used by any terminal desiring to access the network.

In particular, the network can reserve a time-frequency resource larger than the RACH resource conventionally reserved for the RACH procedure, in order for the terminal to be able to transmit its unique identifier (or more generally a first piece of information representative of its unique identifier) with the information conventionally transmitted on the RACH resource.

Alternatively, the network can reserve a distinct time-frequency resource in order for the terminal to be able to transmit at least one first piece of information representative of its unique identifier.

A terminal desiring to access the network can thus directly transmit to the network (i.e. to at least one entity of the network, for example a base station), in the physical layer, its unique identifier, as well as optionally a useful message intended for another terminal, on at least one specific time-frequency resource reserved by the network.

According to the information received, the network can send a response to the terminal. The exchange of these two main messages (an access request and a response to the access request) between the terminal and the network is sufficient to authorize the terminal to access the network or not.

The terminal can then return to standby mode or remain in active mode and continue the configuration procedure.

In particular, in the context of an application of the instant messaging type, according to which the terminal sends one or more short message, the terminal can access the network and transmit a short message via the exchange of these two main messages, without requiring the implementation of a procedure of configuration of the terminal (of the RCC type for example), and can go back into standby mode after each sending, if it does not desire to continue by a communication phase, or remain in active mode, for example if several messages must be transmitted.

Below, in relation to FIG. 2, the main steps implemented by a terminal 21 and an entity of a communication network, for example a base station 22 according to an embodiment of the invention are presented.

Conventionally, the base station 22 broadcasts 221 system information in the network. Such system information can be broadcast periodically, and carries in particular a synchronization signal (for example of the Synchronization Signal Block SSB type) allowing in particular the terminals desiring to access the network to synchronize with the base station.

According to the invention, the system information is modified and comprises an identification of at least one time-frequency resource capable of carrying a piece of information relative to a unique terminal identifier.

When the terminal 21 exits standby mode or enters a coverage zone of the base station 22, it can thus receive 211 the system information broadcast by the base station 22 and synchronize with the base station for the downlinks.

The terminal 21 can thus transmit 212 to the base station a request for access to the network. Such an access request carries in particular a first piece of information representative of a unique identifier of the terminal. According to the invention, the first piece of information representative of a unique identifier of the terminal is transmitted on at least one of said time-frequency resources identified on the basis of the system information and thus reserved by the network, called specific resource.

The base station 22 observes an uplink channel, for example the RACH channel, and verifies 222 whether the first piece of information representative of a unique identifier of the terminal has been received on one of said time-frequency resources reserved by the network.

In the case of a positive verification, the base station transmits 223 to the terminal a response carrying a second piece of information representative of the unique identifier of the terminal.

The terminal 21 verifies 213 whether a response to the access request has been received.

In the case of a positive verification, and more precisely in the case of reception of a response to the access request carrying a second piece of information representative of the unique identifier of the terminal, the terminal considers that it has been authorized to access the network.

If it does not desire to continue the configuration procedure and the communication phase, it can go into standby mode. Otherwise, it can remain in active mode.

5.2 Description of a Specific Embodiment

An exemplary embodiment of the invention, according to which the access request carries a first piece of information representative of a unique identifier of the terminal, as well as a useful message, intended to be transmitted to another terminal, is presented below.

In particular, such a useful message can be a short message, i.e. having a size of approximately several bits or kilobits.

According to this example, it is considered that the system information, provided by the network, identifies one or more time-frequency resources capable of carrying a preamble and noted as RACH_O, as well as, for each resource RACH_O, one or more time-frequency resources capable of carrying a piece of information relative to a unique terminal identifier and noted as TFR. Moreover, according to this example, the resources TFR are also capable of carrying a useful message. For example, three resources TFR1-1, TFR1-2 and TFR1-3 are associated with a first resource RACH_O1, two resources TFR2-1 and TFR2-2 are associated with a second resource RACH_O2, etc.

The various resources TFR associated with a resource RACH_O can be reserved to transmit useful messages having different sizes, in addition to the unique identifier of the terminal. The resource TFR1-1 can be reserved to transmit useful messages having a small size, for example less than 10 bits (generated for example in the context of applications with a low bitrate: data coming from a sensor, M2M (Machine-to-Machine) communication, etc.). The resource TFR1-2 can be reserved to transmit useful messages having a medium size, for example between 10 bits and 100 bits (generated for example in the context of applications with a medium bitrate: Facebook, Twitter—trademarks, etc.). The resource TFR1-3 can be reserved to transmit useful messages having a large size, for example greater than 100 bits (generated for example in the context of applications with a high bitrate).

The system information can also carry information on modulation and coding, MCS, associated with each resource TFR.

Moreover, the system information can carry a piece of information relative to a maximum number of cyclical offsets that the terminal is authorized to apply to a predefined base sequence.

Figure 2:
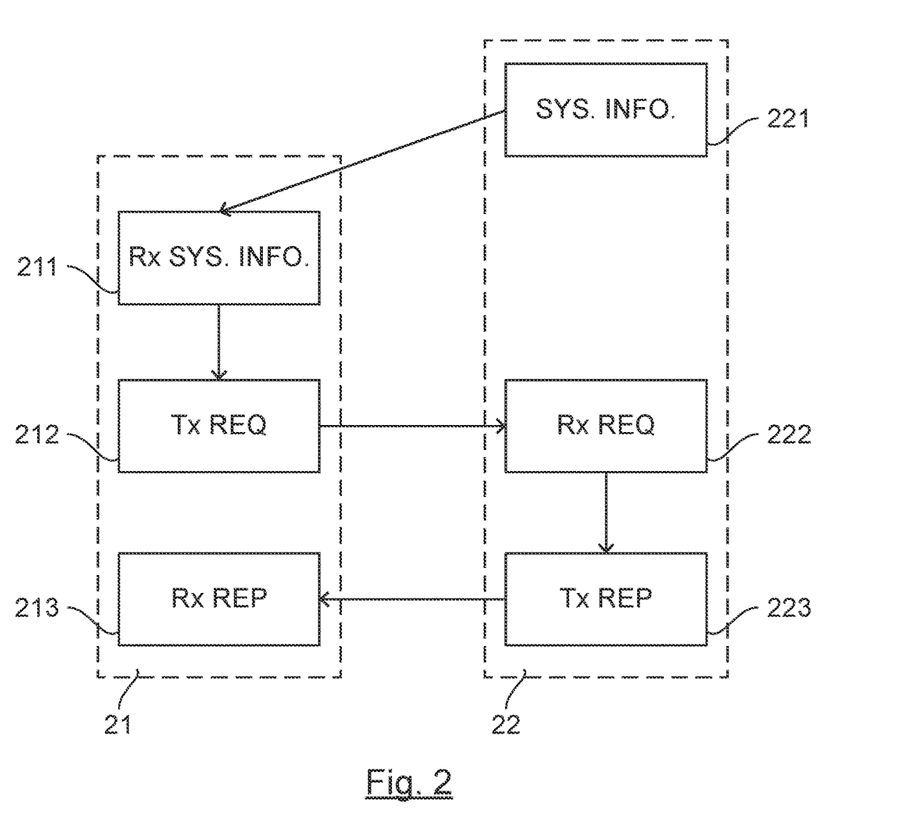
FIG. 2 illustrates the main steps implemented by a terminal and a base station according to an embodiment of the invention.

As indicated in relation to FIG. 2, upon reception of the system information, the terminal can transmit an access request to the base station, during a first phase.

To do this, it selects a preamble, for example from a group of preambles conventionally used in the RACH procedure, and a resource RACH_O from the resources RACH_O identified in the system information. For example, it selects the resource RAC H_O1.

The terminal must then select a resource TFR, from the resources TFR associated with the resource RACH_O1. If it desires to transmit only its unique identifier, it can randomly select a resource TFR from the resources TFR associated with the resource RACH_O1. If it desires to transmit its unique identifier and a useful message, it can select a resource TFR while taking into account the size of the useful message that it desires to transmit. For example, if the useful message to be transmitted has a size equal to 20 bits, the terminal selects the resource TFR1-2.

On the basis of the system information, the terminal can also obtain the modulation and coding scheme to be used to transmit the useful message on the resource TFR1-2. It is noted that if the system information identifies several resources TFR, one or more resources TFR can be used to transmit on the one hand the unique identifier of the terminal and on the other hand the useful message. If the system information identifies a single resource TFR, the unique identifier of the terminal and the useful message are transmitted on the same resource TFR.

Figure 3:
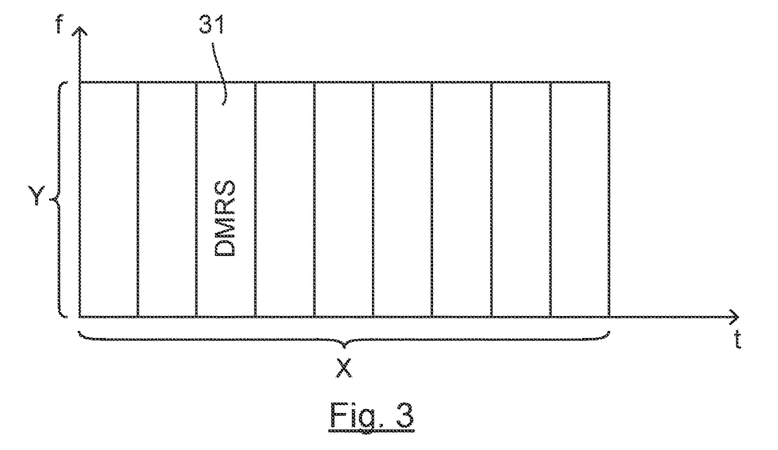
FIG. 3 illustrates the use of a specific time-frequency resource according to an embodiment of the invention.

For example, the resource TFR1-2 reserves a block comprising X time intervals and Y carrier frequencies. As illustrated in FIG. 3, the resource TFR1-2 can carry a temporal succession of X symbols OFDM, each symbol OFDM carrying data modulated by Y blocks of resources in frequency.

According to the example illustrated in FIG. 3, the third symbol OFDM 31 carries a reference signal, for example of the DMRS type, modulated by Y carrier frequencies.

Conventionally, such a reference signal carries a base sequence known to the terminal and to the base station. For example, such a base sequence is normalized.

According to one embodiment of the invention, the reference signal carries a version of the base sequence after cyclical offset.

Indeed, since the specific resources are not reserved for a specific terminal but can be used by any terminal desiring to access the network, it is possible for the same resource to be simultaneously used by several terminals. The cyclical offset applied to the base sequence allows in particular the base station to differentiate the various terminals.

In particular, the offset applied to the base sequence is determined according to the unique identifier of the terminal.

Thus, the base sequence can be decomposed into N equal portions, with N being the number of cyclical offsets authorized, defined in the system information. The number of cyclical offsets to be applied to the base sequence to obtain the reference signal is thus equal to the identifier of the terminal UE_ID, modulo N: mod(UE_ID, N).

Figure 4:
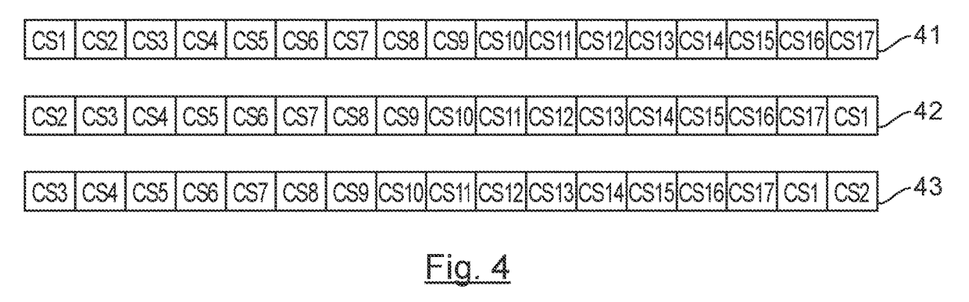
FIG. 4 presents examples of cyclical offset applied to a base sequence.

According to the example illustrated in FIG. 4, the base sequence 41 can be decomposed into 17 equal portions, with 17 being the number of authorized cyclical offsets defined in the system information.

If the unique identifier of the terminal is equal to 1, one cyclical offset is applied to the base sequence, and a first cyclically offset version of the base sequence 42 is obtained.

If the unique identifier of the terminal is equal to 2, two cyclical offsets are applied to the base sequence, and a second cyclically offset version of the base sequence 43 is obtained.

If the unique identifier of the terminal is equal to 55, four cyclical offsets are applied to the base sequence (mod (55,17)=4).

According to the latter example, since the unique identifier of the terminal is greater than N, the terminal can also transmit to the base station the remaining value corresponding to the whole part of the ratio between the unique identifier and the maximum number of cyclical offsets, i.e. the value 3 according to the example above.

This remaining value can in particular be transmitted on a symbol OFDM of the resource TFR1-2 for example.

Thanks to the cyclical offset of the base station, and this remaining value, the terminal can transmit a first piece of information representative of its unique identifier to the base station.

The terminal can thus transmit the access request carrying the preamble, the first piece of information representative of the unique identifier of the terminal and the useful message to the base station. This step corresponds to the step 212 of FIG. 2.

According to the example described above, the preamble can be transmitted on the resource RACH_O1, and the first piece of information representative of the unique identifier of the terminal and the useful message can be transmitted on the resource TFR1-2. In particular, the data carried by the resource TFR1-2 can be encoded by using an identifier RA-RNTI, associated with the resource RACH_O1. More generally, the data transmitted on the specific resources can be encoded by using an identifier RA-RNTI.

According to a specific embodiment, the access request can also carry an indicator indicating whether the terminal desires to go into standby mode upon reception of a response to the access request, or desires to continue the attachment phase, for example by the implementation of the RCC protocol. This indicator can in particular be transmitted on the resource TFR1-2, on the resource RACH_O1, or on another time-frequency resource. Alternatively, at least two types of preamble are defined, a first type of preamble to be used when the terminal desires to go into standby mode after having accessed the channel, a second type of preamble to be used when the terminal desires to continue the configuration procedure after having accessed the channel. According to this alternative, the indicator is therefore the type of the selected preamble. According to yet another alternative, the absence of a useful message in the access request means that the terminal desires to remain in active mode. The presence or the absence of a useful message can thus be used as an indicator.

In particular, if the terminal only occasionally transmits useful messages, for example because it uses an application of the instant messaging type, this indicator can automatically be positioned at a value indicating that the terminal desires to go into standby mode upon reception of a response to the access request.

Inversely, if the terminal regularly transmits useful messages, the indicator can indicate that the terminal desired to remain in active mode upon reception of a response to the access request.

After transmission of the access request, the terminal remains waiting for a response on the part of the base station.

It thus listens to a dedicated downlink channel, for example the PDCCH (physical downlink control channel), during a predetermined time interval, also called RAR window.

During a second phase, the base station thus processes the access request and can transmit a response to the terminal to inform it whether it is authorized to access the network or not, i.e. whether the access request has indeed been received, or inform it of a possible conflict.

In particular, such a response can be encoded by using an identifier RA-RNTI, associated with the resource RACH_O1 according to the previous example. In this way, only the terminal having used the resource RACH_O1 for the transmission of the preamble can decode the response of the base station.

The processing implemented by the base station is described below.

The base station listens to an uplink channel, for example the RACH channel, and verifies whether a preamble has been received on a dedicated resource, known to the base station (for example RACH_O1, RACH_O2). If a preamble has been detected (for example on the resource RACH_O1), it verifies whether a unique identifier of the terminal has been received on at least one specific resource associated with the dedicated resource carrying the preamble detected (for example the resources TFR1-1, TFR1-2, TFR1-3).

Various cases are distinguished according to whether the base station has received entirely, partly, or has not received the access request.

Figure 5:
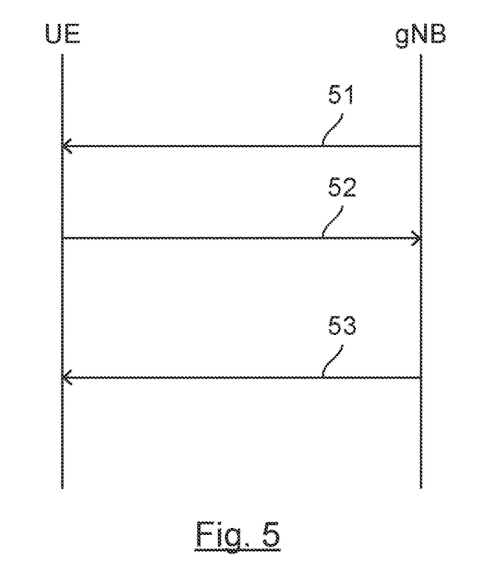
FIG. 5 illustrates the messages exchanged between a terminal and a base station according to a first example.

According to a first case, illustrated in FIG. 5, it is considered that the terminal UE has received the system information 51 broadcast by the base station, for example gNB, and has transmitted an access request 52 carrying a preamble, a useful message and a first piece of information representative of the unique identifier of the terminal.

Taking up the previous example again, the base station receives the preamble on the resource RACH_O1, and the useful message and the first piece of information representative of the unique identifier of the terminal on the resource TFR1-2. Upon reception of the reference signal transmitted on the resource TFR1-2, the base station can determine the number of cyclical offsets applied to the base sequence, i.e. 4, since it knows the base sequence. The base station also receives the remaining value. Knowing this remaining value, i.e. 3, the number of cyclical offsets applied to the base sequence, i.e. 4, and the maximum number of cyclical offsets authorized, i.e. 17, the base station can determine the unique identifier of the terminal (3*17+4=55).

The base station can thus send to the terminal a response 53 carrying a piece of information representative of the preamble transmitted on the resource RACH_O1, for example PID, and a second piece of information representative of the unique identifier of the terminal. According to the above example, the second piece of information representative of the identifier of the terminal is 55 (UE_ID).

When the terminal receives the response 53 during the RAR window, if it detects that the piece of information representative of the preamble PID indeed corresponds to the preamble that it selected for the access request, and that the second piece of information representative of the unique identifier of the terminal indeed corresponds to its unique identifier, it considers that access to the network has been authorized. In other words, this means that the base station has correctly identified the terminal and received the useful message. The useful message is thus now handled by the network and can be transmitted to the recipient terminal.

According to this first case, contrary to the conventional RACH procedure, the parameter TA is not transmitted from the base station to the terminal. However, the base station knows the value of this parameter.

In particular, if the access request carries an indicator indicating a return to standby mode after the authorization of access to the network, the terminal can go into standby mode, for example if it does not have any new useful messages to transmit in a predefined time interval following the reception of the response to the access request (for example 2 minutes).

Figure 6:
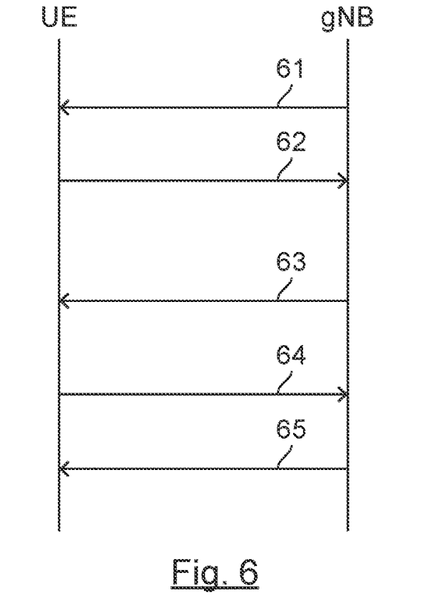
FIG. 6 illustrates the messages exchanged between a terminal and a base station according to a second example.

According to a second case, illustrated in FIG. 6, it is considered that the terminal UE has received the system information 61 broadcast by the base station, for example gNB, and has transmitted an access request 62 carrying a preamble, a useful message and a first piece of information representative of the unique identifier of the terminal.

However, taking up the previous example again, the base station receives only the preamble on the resource RACH_O1, but does not receive the useful message and/or the first piece of information representative of the unique identifier of the terminal on the resource TFR1-2 (for example after a transmission problem on this time-frequency resource, a decoding problem, a synchronization problem, etc.).

The base station can thus send to the terminal a response 63 carrying a piece of information representative of the preamble, for example PID, and identifying at least one new time-frequency resource (for example in the form of the parameter "UL grant") in order for the terminal to be able to retransmit the first piece of information representative of its unique identifier, as well as the useful message according to this exemplary embodiment. Moreover, such a response can optionally carry other parameters conventionally used in the RACH procedure, such as the parameters TA and TC-RNTI. Such parameters can be transmitted in the response, or in a distinct message.

When the terminal receives the response 63 during the RAR window, if it detects that the piece of information representative of the preamble PID indeed corresponds to the preamble that it selected for the access request, but it does not detect a second piece of information representative of the unique identifier of the terminal, it considers that the base station has only received the preamble, but not the useful message and/or the first piece of information representative of the unique identifier of the terminal.

The terminal must thus retransmit 64 the useful message and the first piece of information representative of the unique identifier of the terminal.

To do this, the terminal uses the new specific time-frequency resource identified in the response. The parameter TA can be used by the terminal to adjust its instant of emission of the useful message and of the first piece of information representative of the unique identifier of the terminal, and thus facilitate the synchronization with the base station.

In particular, the useful message and the first piece of information representative of the unique identifier of the terminal can be encoded by using the temporary identifier TC-RNTI generated by the base station.

Since the useful message and the first piece of information representative of the unique identifier of the terminal are transmitted on a new time-frequency resource, specifically allocated to the terminal for this transmission by the base station, the probability of the base station receiving the useful message and the first piece of information is higher.

The base station can thus respond 65 with a confirmation message if it has indeed received the useful message and the first piece of information representative of the unique identifier of the terminal. In this case, the terminal considers that access to the network has been authorized, i.e. that the base station has correctly identified the terminal and received the useful message.

Otherwise, the base station can respond with an error message. In this case, the terminal must restart the access procedure, and transmit a new access request.

According to a third case, not illustrated, it is considered that the terminal UE has received the system information broadcast by the base station gNB, and has transmitted an access request carrying a preamble, a useful message and a first piece of information representative of the unique identifier of the terminal.

However, the terminal has not received a response to the access request during the RAR window. In this case, the terminal considers that the access procedure failed. The terminal must thus restart the access procedure and transmit a new access request.

In the above example, the transmission of an access request carrying a preamble, a first piece of information representative of the unique identifier of the terminal, and a useful message was considered for illustrative purposes. It is recalled, however, that only the transmission of the first piece of information representative of the unique identifier of the terminal on a time-frequency resource identified by the system information is necessary for the terminal to be able to rapidly access the network, as illustrated in FIG. 2. The transmission of the preamble and the transmission of the useful message are both optional.

In particular, the use of the preamble allows the base station to detect that a terminal has entered the network. However, other techniques can be implemented, in particular the simple transmission, by the terminal, of its unique identifier.

Moreover, in the above example, the transmission of the preamble on the resource RACH_O1, and of the first piece of information representative of the unique identifier of the terminal on the resource TFR1-2, were considered. It is noted that the first piece of information representative of the unique identifier of the terminal, as well as optionally the useful message, can be transmitted on the resource RACH_O1, if the size of the time-frequency resource reserved by the network is sufficient.

5.3 Devices

Figure 7:
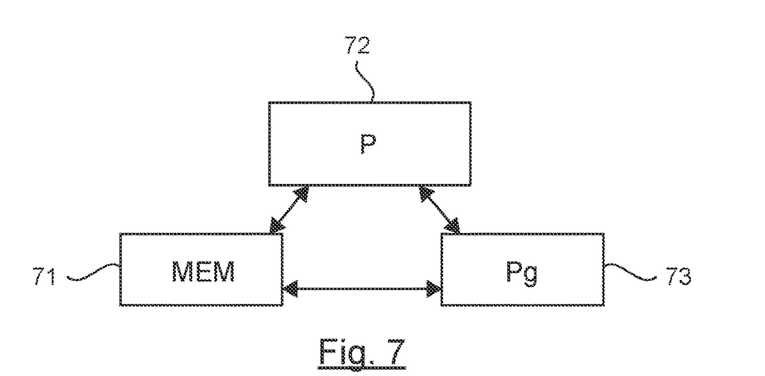
FIG. 7 presents the simplified structure of a terminal implementing a method for access to a network according to an embodiment of the invention.
Figure 8:
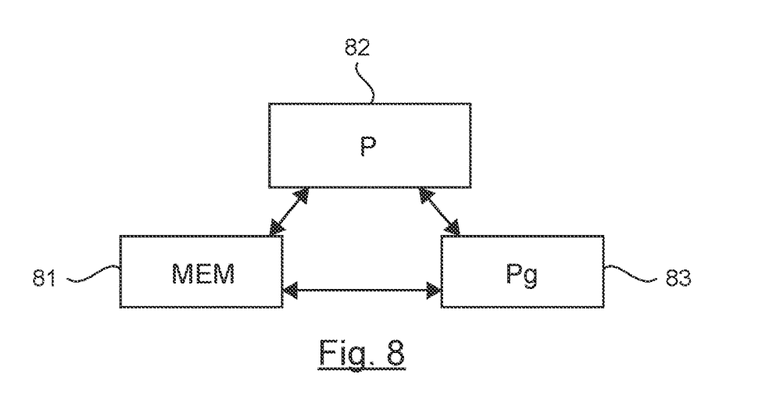
FIG. 8 presents the simplified structure of a base station implementing a method for attachment to a network according to an embodiment of the invention.

Finally, in relation to FIGS. 7 and 8, the simplified structures of a terminal and of an entity of the network, for example a base station, according to at least one embodiment described above are presented.

As illustrated in FIG. 7, a terminal according to at least one embodiment of the invention comprises at least one memory 71 and at least one processing unit 72, equipped for example with a programmable calculation machine or a dedicated calculation machine, for example a processor P, and controlled by the computer program 73, implementing steps of the method for access to a communication network according to at least one embodiment of the invention.

Upon initialization, the code instructions of the computer program 73 are for example loaded into a RAM memory before being executed by the processor of the processing unit 72.

The processor of the processing unit 72 implements steps of the method for access to a communication network, according to the instructions of the computer program 73, to:
receive system information broadcast by the communication network that the terminal desires to access, the system information comprising an identification of at least one time-frequency resource capable of carrying a piece of information relative to a unique terminal identifier, transmit to the network an access request, said access request carrying a first piece of information representative of a unique identifier of said terminal, transmitted on one of said time-frequency resources identified on the basis of said system information, called specific resource, receive a response to said access request, the access of the terminal to said network being authorized in the case of reception of a response to said access request carrying a second piece of information representative of the unique identifier of said terminal.

As illustrated in FIG. 8, a base station according to at least one embodiment of the invention comprises at least one memory 81 and at least one processing unit 82, equipped for example with a programmable calculation machine or a dedicated calculation machine, for example a processor P, and controlled by the computer program 83, implementing steps of the method for attachment to the network according to at least one embodiment of the invention.

Upon initialization, the code instructions of the computer program 83 are for example loaded into a RAM memory before being executed by the processor of the processing unit 82.

The processor of the processing unit 82 implements steps of the method for attachment to the network described above, according to the instructions of the computer program 83, to:
broadcast system information comprising an identification of at least one time-frequency resource capable of carrying a piece of information relative to a unique terminal identifier, verify the reception, on at least one of said time-frequency resources identified on the basis of said system information, called specific resource, of a first piece of information representative of a unique identifier of said terminal, carried by a request for access to said network, transmit to said terminal a response to said access request carrying a second piece of information representative of the unique identifier of said terminal, if said first piece of information representative of a unique identifier of said terminal is received.

The invention claimed is:

1. A method for accessing a communication network, implemented by a terminal, comprising:
receiving system information broadcast by said network, the system information comprising an identification of at least one time-frequency resource capable of carrying a piece of information relative to a unique terminal identifier;

transmitting to said network an access request, said access request carrying a first piece of information representative of a unique identifier of said terminal, transmitted on at least one of said time-frequency resources identified on the basis of said system information, called specific resource; and authorizing access to said network in the case of reception of a response to said access request carrying a second piece of information representative of the unique identifier of said terminal, wherein said access request also carries a useful message transmitted on said specific resource or on at least one time-frequency resource capable of carrying a useful message, identified on the basis of said system information.

2. The method according to claim 1, according to which, since said system information identifies at least two time-frequency resources capable of carrying the useful message, said method comprises selecting at least one of said time-frequency resources while taking into account a size of said useful message.

3. The method according to claim 1, according to which, the unique identifier of said terminal is an integer, and said transmission also transmits a reference signal obtained by applying a cyclical offset to a predefined base sequence, determined according to the unique identifier of said terminal.

4. The method according to claim 3, according to which, when the unique identifier of said terminal is greater than a maximum number of cyclical offsets, said first piece of information representative of the unique identifier of said terminal comprises a whole part of a ratio between the unique identifier and the maximum number of cyclical offsets, the maximum number of cyclical offsets being obtained on the basis of said system information.

5. The method according to claim 1, according to which said access request also carries at least one indicator indicating a return to standby mode of said terminal after the authorization of access to said network.

6. The method according to claim 1, according to which said access request also carries a preamble selected from a plurality of preambles, transmitted on said specific resource or on a time-frequency resource capable of carrying the preamble, identified on the basis of said system information, according to which the authorization of access to said network is granted when said response to the access request carries the second piece of information representative of the unique identifier of said terminal and a piece of information representative of said selected preamble and according to which, in the case of reception of a response to said access request not carrying a second piece of information representative of the unique identifier of said terminal, said method comprises retransmitting said access request, said first piece of information representative of the unique identifier of the terminal being transmitted on a new specific time-frequency resource identified in said response.

7. The method according to claim 1, according to which said useful message is an instant message.

8. The method according to claim 1, according to which said first piece of information and/or said useful message are transmitted to said network while taking into account a piece of information on modulation and coding associated with the corresponding time-frequency resource, said piece of information on modulation and coding being obtained on the basis of said system information.

9. The method as claimed in claim 1, wherein said useful message is intended to be transmitted to at least one other terminal.

10. A method for attachment of a terminal to a communication network, comprising:

broadcasting system information by said network, the system information comprising an identification of at least one time-frequency resource capable of carrying a piece of information relative to a unique terminal identifier;

verifying reception, on at least one of said time-frequency resources identified on the basis of said system information, called specific resource, of a first piece of information representative of a unique identifier of said terminal, carried by a request for access to said network; and in response to said first piece of information representative of a unique identifier of said terminal being received, transmitting to said terminal a response to said access request, carrying a second piece of information representative of the unique identifier of said terminal, wherein said verifying also verifies reception, on said specific resource or on at least one time-frequency resource capable of carrying a useful message, identified on the basis of said system information, of a useful message, and wherein the method comprises transmitting said useful message in response to said first piece of information representative of a unique identifier of said terminal and said useful message being received.

11. The method according to claim 10, also comprising:

verifying reception, on said specific resource or on at least one time-frequency resource capable of carrying a preamble, identified on the basis of said system information, a preamble carried by said access request, if said preamble is received, and said first piece of information representative of an identifier of said terminal is not received, transmitting to said terminal a response to said access request carrying a piece of information representative of said preamble and identifying a new specific time-frequency resource.

12. A terminal comprising:

at least one processing unit configured to:

receive system information broadcast by a communication network that the terminal desires to access, the system information comprising an identification of at least one time-frequency resource capable of carrying a piece of information relative to a unique terminal identifier;

transmit to said network a request for access to said network, said access request carrying a first piece of information representative of a unique identifier of said terminal, transmitted on at least one of said time-frequency resources identified on the basis of said system information, called specific resource; and receive a response to said access request, the access of the terminal to said network being authorized in the case of reception of a response to said access request carrying a second piece of information representative of the unique identifier of said terminal, wherein said access request also carries a useful message transmitted on said specific resource or on at least one time-frequency resource capable of carrying a useful message, identified on the basis of said system information.

13. A base station of a communication network, comprising:

at least one processing unit configured to:

broadcast system information comprising an identification of at least one time-frequency resource capable of carrying a piece of information relative to a unique terminal identifier;

verify the reception, on at least one of said time-frequency resources identified on the basis of said system information, called specific resource, of a first piece of information representative of a unique identifier of said terminal, carried by a request for access to said network;

transmit to said terminal a response to said access request carrying a second piece of information representative of the unique identifier of said terminal, if said first piece of information representative of an identifier of said terminal is received;

verify a reception, on said specific resource or on at least one time-frequency resource capable of carrying a useful message, identified on the basis of said system information, of a useful message; and transmit said useful message in response to said first piece of information representative of the unique identifier of said terminal and said useful message being received.

14. A non-transitory computer-readable medium comprising a computer program stored thereon including instructions for implementing a method for accessing a communication network when this program is executed by a processor of a terminal, wherein the method comprises:

receiving system information broadcast by said network, the system information comprising an identification of at least one time-frequency resource capable of carrying a piece of information relative to a unique terminal identifier;

transmitting to said network an access request, said access request carrying a first piece of information representative of a unique identifier of said terminal, transmitted on at least one of said time-frequency resources identified on the basis of said system information, called specific resource; and authorizing access to said network in the case of reception of a response to said access request carrying a second piece of information representative of the unique identifier of said terminal, wherein said access request also carries a useful message transmitted on said specific resource or on at least one time-frequency resource capable of carrying a useful message, identified on the basis of said system information.

15. A non-transitory computer-readable medium comprising a computer program stored thereon including instructions for implementing a method for attachment of a terminal to a communication network when the program is executed by a processor, wherein the method comprises:

broadcasting system information by said network, the system information comprising an identification of at least one time-frequency resource capable of carrying a piece of information relative to a unique terminal identifier;

verifying reception, on at least one of said time-frequency resources identified on the basis of said system information, called specific resource, of a first piece of information representative of a unique identifier of said terminal, carried by a request for access to said network; and in response to said first piece of information representative of a unique identifier of said terminal being received, transmitting to said terminal a response to said access request, carrying a second piece of information representative of the unique identifier of said terminal, wherein said verifying also verifies reception, on said specific resource or on at least one time-frequency resource capable of carrying a useful message, identified on the basis of said system information, of a useful message, and wherein the method comprises transmitting said useful message in response to said first piece of information representative of a unique identifier of said terminal and said useful message being received.

* * * * *